United States Patent [19]
Citron

[11] 3,962,199
[45] June 8, 1976

[54] PROCESS FOR REMOVING VANADIUM CATALYST RESIDUES FROM POLYMER SOLUTIONS
[75] Inventor: Joel David Citron, Wilmington, Del.
[73] Assignee: E. I. Du Pont de Nemours and Company, Wilmington, Del.
[22] Filed: Feb. 28, 1975
[21] Appl. No.: 554,224

[52] U.S. Cl. .............................. 528/485; 528/488; 526/90; 526/339; 526/350
[51] Int. Cl.² ............................................ C08F 6/08
[58] Field of Search ............ 450/767, 768.5, 94.9 F, 450/88.2 S, 80.78, 93.7

[56] References Cited
UNITED STATES PATENTS

| | | | |
|---|---|---|---|
| 2,902,442 | 9/1959 | Erdman et al. | 208/253 |
| 2,962,451 | 11/1960 | Schreyer | 252/429 |
| 3,118,865 | 1/1964 | Bruce et al. | 260/93.7 |
| 3,218,266 | 11/1965 | Ludlum | 252/429 |
| 3,271,372 | 9/1966 | Caywood | 260/80.5 |
| 3,337,514 | 8/1967 | Knabeschuh et al. | 260/80.7 |
| 3,726,843 | 4/1973 | Anblick et al. | 260/80.78 |
| 3,750,736 | 8/1973 | Batt et al. | 159/165 |
| 3,819,591 | 6/1974 | Campbell et al. | 260/80.78 |

Primary Examiner—Stanford M. Levin

[57] ABSTRACT

Removal of dissolved vanadium catalyst residues from α-olefin polymer solutions improves the heat stability of the polymer recovered therefrom. Vanadium residues are removed from α-olefin polymer solutions in inert solvents by contacting the solutions at 50°–225°C. with one or more active metals, either in their elemental form or as alloys, selected from alkali metals, aluminum, and zinc, and separating the solutions from vanadium residues precipitated thereby. The process can be carried out continuously by passing the polymer solution through a column containing the active metal.

19 Claims, No Drawings

PROCESS FOR REMOVING VANADIUM CATALYST RESIDUES FROM POLYMER SOLUTIONS

BACKGROUND OF THE INVENTION

This invention relates to an improvement in the aftertreatment of α-olefin polymers made with certain vanadium coordination catalysts, and in particular, to a process for removing dissolved vanadium residues from solutions of the polymers which have been prepared in the presence of vanadium-based catalysts.

Homopolymerization and copolymerization of many α-olefins is known. For the purpose of the present disclosure, the term "polymerization" includes both homo- and copolymerization, and the term "polymer" includes both homo- and copolymers. Typical commercial polymers include polyethylene, EPDM rubber, and ethylene/propylene copolymers (EPM rubber). In many α-olefin polymerization processes, a vanadium-based coordination catalyst is used. Coordination catalysts are well known in the polymer art as Ziegler catalysts. Vanadium-based catalysts are made by combining a vanadium compound, preferably one soluble in hydrocarbons, and an organometallic reducing compound of a metal of Groups I–III of the Periodic Table, preferably aluminum.

Polymerization is normally carried out in a liquid phase, often in solution in a saturated hydrocarbon, most often in a continuous system. The reactor effluent containing the polymer usually also contains various impurities, for example, spent catalyst residues and unchanged monomer. It is important to remove from the polymer solution the vanadium residues before the polymer is recovered because such residues, if present in the polymer, adversely affect its heat stability. Polymer can be isolated from solution by phase decantation, i.e., by heating the solution to a temperature at which the solution separates into two phases: a polymer-poor phase and a polymer-rich phase, from which polymer is recovered by flashing off residual solvent. This procedure, described in U.S. Pat. No. 3,726,843 to Anolick et al., produces a polymer containing a significant amount of vanadium impurities. It thus is necessary to remove vanadium from the polymer solution before phase decantation occurs. Polymer solutions which are to be subjected to steam vaporization, for example, as taught in U.S. Pat. No. 3,750,736 Batt et al., also require vanadium removal.

Various methods of removing vanadium from the polymers are known. For example, U.S. Pat. No. 3,271,372, to C. W. Caywood, Jr., discloses a process wherein an alcohol is added to an ethylene copolymer slurry in methylene chloride to disperse the granular particles of the copolymer and the copolymer is separated from the slurry. U.S. Pat. No. 3,337,514, to Knabeschuh et al., requires contacting a solution of an α-olefin copolymer with steam, then with aqueous mineral acid, then with water under turbulent conditions, and separating the copolymer solution from the aqueous phase. Other techniques are available but all have shortcomings in that complicated installations are required, and that normally other chemical compounds are introduced which then must be separated.

There is a need for a simple and efficient process for removing vanadium residues from α-olefin polymer solutions, and especially a process suitable for continuous vanadium removal.

SUMMARY OF THE INVENTION

According to this invention, it has now been discovered that dissolved vanadium compounds are removed with high efficiency from α-olefin polymer solutions when those solutions are contacted at about 50°–225°C. with at least one metal selected from lithium, sodium, potassium, rubidium, cesium, aluminum, and zinc, and separating the solutions from vanadium residues, which are precipitated thereby. The solvents in which both the α-olefin polymer and the vanadium compounds are dissolved must be inert to the active metal at the operating temperature and pressure, and the solution must be liquid.

DETAILED DESCRIPTION OF THE INVENTION

Any α-olefin polymers prepared in the presence of vanadium-based catalysts in solution in an inert solvent can be purified by the process of the present invention. These include, for example, polyethylene, polypropylene, EPM rubber, and ethylene/propylene/monoreactive nonconjugated diene copolymers (EPDM rubbers) in which the diene monomer can be among others 1,4-hexadiene, 5-ethylidene-2-norbornene, 5-(1-propenyl)-2-norbornene, 5-(2'-butenyl)-2-norbornene, 2-ethyl-2,5-norbornadiene, and dicyclopentadiene. In addition to conventional EPDM rubbers, which are usually tripolymers, tetrapolymers of ethylene, propylene, a nonconjugated monoreactive diene, and a small amount of a nonconjugated direactive diene also are within the scope of the term "α-olefin polymer." Such polymers may be thought of as a special class of EPDM rubbers. They are specifically described in U.S. Pat. No. 3,819,591 of Campbell & Thurn. The preferred copolymer of this class is an ethylene/propylene/1,4-hexadiene/norbornadiene copolymer. Furthermore, tetrapolymers of ethylene, propylene, and two nonconjugated monoreactive dienes are included within the term α-olefin polymer. These are considered to be conventional EPDM rubbers, although less commonplace than tripolymers. A typical such polymer would be, for example, an ethylene/propylene/1,4-hexadiene/5-ethylidene-2-norbornene copolymer. This invention is especially suitable for the purification of EPM and EPDM rubbers or other polymers before they are recovered from their solutions by phase decantation and evaporation of the solvent or by steam vaporization.

Preferred inert solvents are saturated hydrocarbons. These include alkanes, cycloalkanes, and alkylcycloalkanes. Typical solvents include, for example, hexane, isooctane, cyclohexane, cycloheptane, methylcyclohexane, and other hydrocarbons of those classes. These and similar hydrocarbons are well known to those skilled in the art and are commercially available. They can be linear, branched, cyclic substituted with one alkyl group or with two or more alkyl groups, or unsubstituted cyclic. They can be single hydrocarbons or mixtures of hydrocarbons, for example, mixtures of isomers or of homologs. Under moderate reaction conditions, certain halogenated hydrocarbons, e.g., perchloroethylene or methylene chloride can be used, especially with aluminum or zinc. Similarly, ethers can be used, especially with alkali metals. Liquids containing active hydrogen preferably should be absent. Since the solution must be liquid at the operating temperature and pressure, the boiling and melting temperatures of the solvents will be chosen accordingly.

The vanadium residues present in the solution are derived from a vanadium-based coordination catalyst. Polymerization of α-olefins in the presence of Ziegler catalysts has been reviewed in such texts as, for example: *Linear and Stereoregular Addition Polymers*, by N. G. Gaylord and H. F. Mark, Interscience Publishers, Inc., New York, N.Y., 1959, and *Polymerization by Organometallic Compounds*, by L. Reich and A. Schindler, Interscience Publishers, New York, N.Y., 1966. There also are many patents in this area, including U.S. Pat. No. 3,118,865 to Bruce, Jr., et al., U.S. Pat. No. 2,962,451 to Schreyer, and U.S. Pat. No. 3,218,266 to Ludlum. As stated above, vanadium catalysts are made by combining a vanadium compound with an organometallic, usually organoaluminum, compound. The vanadium component can be, for example, vanadium tetrachloride, vanadium trichloride, vanadium oxytrichloride, tetrakis(β-ethoxyethoxy)vanadium, isopropyl vanadate, tris (p-chlorophenyl) vanadate, vanadium tris-(acetylacetonate), and diethoxyvanadyl fluoride. Representative aluminum compounds include alkylaluminum chlorides, dichlorides, and sesquichlorides, such as diethylaluminum chloride, diisobutylaluminum chloride, ethylaluminum dichloride, butylaluminum dichloride, methylaluminum sesquichloride, ethylaluminum sesquichloride, and isobutylaluminum sesquichloride. Other organoaluminum compounds include diphenylaluminum chloride, triethylaluminum, triisobutylaluminum, and isoprenylaluminum.

The metals used according to this invention to remove vanadium (hereinafter, the active metals) should be present in their elemental form. Mixtures or alloys of two or more active metals alone or with certain other metals also can be used. Preferred active metals are aluminum and zinc, especially the former. Suitable mixtures or alloys include, for example, the following: Al:Zn (78:28), Cs:K (10:90), Rb:K (20:80), Na:Zn (50:50), Al:Na (99.82:0.18), Al:Mg (35:65), Zn:Ca (23.5–76.5), Zn:Cu (67.5:32.5), K:Pb (84.1:15.9), Li:Mg (89.8:10.2), Li:Pb (10.5:89.5), Li:Pb (77:23), Zn:Mg (83.9:16.1), Al:Ca (73:27), Na:Pb (10:90), and Na:K (22:76).

Sodium alloys with lead are a preferred class; lead does not interfere with the process of this invention.

It will be obvious to one skilled in the art that the active metal will provide better efficiency if it presents a large surface area. Thus, it will be preferable to use it in the form of powders, small granules, or thin wires. It may also be deposited as a metallic layer on an inert support, for example, on a ceramic substrate; or it may be coated or plated on another metal. A well dispersed liquid metal or alloy also can be used and normally will have a large surface area. Because of possible deactivation of the active metals by oxygen or of violent reaction of finely divided metals with oxygen, the process of the instant invention will normally be conducted in the absence of air. Similarly, water and solvents containing active hydrogen normally are excluded to avoid side-reactions with the active metal. Because of possible corrosion or damage, neither the reaction vessel nor any parts or fittings should be made of an active metal or active metal alloy.

Contacting the α-olefin polymer solution with the active metal can be accomplished by any suitable technique, for example, by simple agitation in a treatment tank. This embodiment can be operated continuously; thus, polymer solution and metal, e.g., sodium, can be separately introduced into an agitated vessel, the effluent flowing to a settling tank from which polymer solution is removed as the upper layer and the metal is drawn off the bottom for recovery and recycling. The metal can be either solid or liquid at the reaction temperature and pressure in the tank. However, it has been found that it is especially practical to pass the α-olefin polymer solution through a column containing the active metal and maintained within the desired temperature range. The precipitated vanadium residues stay on the column, and vanadium can be recovered therefrom. The active metal, which initially was in elemental form, is converted to a metal compound, some of which may dissolve in the polymer solution. Most of the aluminum or other metal from the original organometallic reducing compound originally present in the catalyst also is present in the solution and is not substantially affected by the active metal treatment. The residual concentration of vanadium can be readily determined experimentally by analyzing the column effluent for vanadium. If the concentration of vanadium is above acceptable limits, the rate of flow can be decreased to provide longer residence time. Flow rates or residence times can be similarly selected for stirred vessel operations.

Because of the low melting points of sodium, potassium, rubidium, and cesium, these metals are not recommended for use in the column arrangement, unless they are used in the form of their higher melting alloys. Other alloys or mixtures of active metals used in the column also should have sufficiently high melting points to remain solid at the column temperature and pressure. Since any active metal compounds which have been eluted from the column eventually become physically incorporated into the polymer by evaporation of the solvent from the solution, it may be advisable to decompose any such metal residues, for example, by adding a small amount of an alcohol before the solvent is removed to give dry polymer. Such decomposed active metal residues do not cause polymer instability.

The optimum temperature which will be used in the process of the present invention will depend, among others, on the desired solution viscosity. Phase separation should be avoided; the temperature and pressure should be selected accordingly. As a rule, the vanadium removal occurs more efficiently at a higher temperature. The contact time of usual commercial polymer solutions streams normally will be a few minutes but will necessarily vary depending on the active metal used, its physical form, the technique used, and the temperature. The polymerization reactor effluent stream usually contains some unpolymerized monomers. These can be removed prior to the treatment according to this invention. Usually, volatile monomers, such as ethylene, are removed by flashing, leaving the polymer solution reasonably free of unsaturated hydrocarbons. Dry polymer isolated from solutions treated by the process of the present invention should contain no more than about 200 p.p.m. of vanadium, preferably no more than about 25–100 p.p.m.

Vanadium is determined colorimetrically at 412 nm using a working plot of absorbance vs. p.p.m. $V^{+5}$. The polymer sample weight is typically 2.500 grams when up to 60 p.p.m. vanadium is present. Appropriate weights can be selected when there is more vanadium. General references include E. R. Wright and M. G.

Millon, *Industrial Engineering Chemistry, Analytical Edition*, 9, p. 251 (1937) and E. B. Sandel, *Colorimetric Determination of Traces of Metals*, Interscience Publishers, New York City, 1959, pages 926–928.

Organic material is removed by combustion of polymer in a muffle furnace at 900°C. for 10 minutes. In the illustrative procedure which follows, the proportions are based on a sample weight of 2.500 grams containing up to about 60 p.p.m. V. After the ignition residue containing vanadium as $V^{+5}$ has been dissolved at room temperature in 5.0 ml. of warm 14 weight percent sulfuric acid, the clear solution is placed in a 50 ml. flask, and treated with 0.030 gram of potassium periodate (caution, very toxic and harmful to skin) to insure complete oxidation of the vanadium. Two ml. of 33.3 weight percent phosphoric acid and 2.0 milliliters of 1N aqueous sodium tungstate ($Na_2WO_4.2H_2O$) are added to form the yellow phosphotungstovanadic acid complex. Following this step, the mixture is brought to a boil, cooled to room temperature, and diluted to volume with deionized water. The absorbance of the complex at 412 nm is proportional to the concentration of vanadium in the sample. The calibration curve is made using standard solutions.

The invention is now illustrated by examples of certain representative embodiments thereof, wherein all parts, proportions, and percentages are by weight unless otherwise indicated.

EXAMPLES 1–5

A solution in hexane of an ethylene/propylene/1,4-hexadiene polymer, prepared with a catalyst consisting of either $VOCl_3$ or $VCl_4$ and an alkylaluminum chloride, was taken from a polymerization reactor and most of the excess monomer (i.e., propylene and ethylene) was flashed off. The solution was used as is or diluted with pure hexane.

It was then heated to the appropriate temperature and passed through a one-inch I.D. × 8-inch long stainless steel column either filled or partly filled with the active metal. The column was maintained at approximately the same temperature as the solution.

Approximately 800 ml. of polymer solution was passed through the column in two hours in each case. Samples of the polymer solution were taken; the hexane was removed by distillation, and the polymer was analyzed for vanadium. The original vanadium content of the polymer was obtained in a similar way on the untreated solution.

The operating conditions and the results are shown in the Table below.

the original amount of vanadium is entirely feasible. As can be readily appreciated, a much better vanadium removal efficiency is obtained at a higher temperature. By properly selecting the process conditions, such as column temperature, solution residence time, and metal contact area, one-pass reduction of the vanadium concentration to the desired level is entirely feasible.

I claim:

1. A process for removing dissolved vanadium residues from a solution of a hydrocarbon α-olefin polymer consisting of homopolymers of α-olefins and copolymers of α-olefins with monomers selected from other α-olefins and nonconjugated dienes, said process comprising contacting in the absence of oxygen said solution with one or more active metals selected from the group of lithium, sodium, potassium, rubidium, cesium, zinc, and aluminum at a temperature of about 50°–225°C. and separating the solution from insoluble vanadium residues precipitated thereby;

with the proviso that the solvent in which the α-olefin polymer and the vanadium residues are dissolved is inert to the active metal at the operating temperature and pressure, and that the solution is liquid.

2. The process of claim 1 which is carried out in the absence of liquids having active hydrogen atoms.

3. The process of claim 1 wherein the solvent is a saturated hydrocarbon.

4. The process of claim 3 wherein the solvent is hexane.

5. The process of claim 1 wherein the active metal is sodium, aluminum, or zinc.

6. The process of claim 1 wherein the active metal is coated on an inert support.

7. The process of claim 1 wherein the active metal is in the form of an alloy with another active metal or an inactive metal.

8. The process of claim 7 wherein the alloy is an alloy of sodium and lead.

9. The process of claim 1 wherein the active metal has a large surface area.

10. The process of claim 1 wherein the α-olefin polymer is a copolymer of ethylene, propylene, and a monoreactive nonconjugated diene.

11. The process of claim 10 wherein the diene is 1,4-hexadiene.

12. The process of claim 1 wherein the α-olefin polymer is a copolymer of ethylene, propylene, a nonconjugated monoreactive diene, and a nonconjugated direactive diene.

13. The process of claim 12 wherein the α-olefin polymer is a copolymer of ethylene, propylene, 1,4-

TABLE

| | Metal | | | | | Polymer, Original | | V, ppm in |
| Example | Type | Form | gm | Temp., °C. | V, ppm | % Solids in Solution | Wallace Plasticity | Polymer, final |
| --- | --- | --- | --- | --- | --- | --- | --- | --- |
| 1 | Aluminum | ≤ 20 mesh | 40 | 80–85 | 3141 | 3.9 | 40 | 252 |
| 2 | Aluminum | ≤ 20 mesh | 40 | 140 | 841 | 5.1 | 32 | <2 |
| 3 | 10% Na-90% Pb | lumps | 200 | 80–85 | 3141 | 3.9 | 40 | 263 |
| 4 | Zinc[a] | 30 mesh | 80 | 85 | 3141 | 3.9 | 40 | 367[b] |
| 5 | Zinc[a] | 30 mesh | 80 | 140 | 841 | 5.1 | 32 | 27[c] |

[a] Washed before use with 5% HCl
[b] Also contained 616 ppm zinc
[c] Also contained ~75 ppm zinc It can be seen from the above results that reduction of vanadium to only a few percent of its original concentration is readily achieved by the process of this invention, and that reduction to less than 1 percent of hexadiene, and norbornadiene.

14. The process of claim 1 wherein the α-olefin polymer is a copolymer of ethylene, propylene, and two nonconjugated monoreactive dienes.

15. The process of claim 1 wherein the active solid metal is present as a layer in a column maintained at the desired temperature within the 50°–225°C. range, and the α-olefin polymer solution is passed through the active metal layer contained in said column at a flow rate sufficient to result in the removal from said solution of the desired proportion of dissolved vanadium.

16. The process of claim 15 wherein the α-olefin polymer is a copolymer of ethylene, propylene, and a monoreactive nonconjugated diene.

17. The process of claim 16 wherein the diene is 1,4-hexadiene.

18. The process of claim 15 wherein the α-olefin is a copolymer of ethylene, propylene, a monoreactive nonconjugated diene, and a direactive nonconjugated diene.

19. The process of claim 1 wherein the α-olefin polymer is a copolymer of ethylene with propylene.

* * * * *